United States Patent

[11] 3,598,213

| [72] | Inventors | Emil Giese;<br>Ruprecht Maurer; Albrecht Maurer, all of<br>Bad Homburg, vor der Hohe, Germany |
|---|---|---|
| [21] | Appl. No. | 2,323 |
| [22] | Filed | Jan. 12, 1970 |
| [45] | Patented | Aug. 10, 1971 |
| [73] | Assignee | Ringspann Albrecht Maurer K.G.<br>Bad Homburg vor der Hohe, Germany |
| [32] | Priority | Mar. 25, 1969 |
| [33] | | Germany |
| [31] | | P 19 15 099.3 |

[54] METAL RETAINER RING FOR FREEWHEEL CLUTCH
12 Claims, 10 Drawing Figs.

[52] U.S. Cl............................................... 192/45.1, 192/41 A
[51] Int. Cl.............................................. F16d 41/07
[50] Field of Search........................................... 192/41 A, 45.1

[56] References Cited
UNITED STATES PATENTS

| 2,783,864 | 3/1957 | Dodge............................ | 192/45.1 |
| 2,820,537 | 1/1958 | Sauzedde....................... | 192/45.1 |
| 2,954,855 | 10/1960 | Lund............................... | 192/45.1 |
| 3,066,779 | 12/1962 | Maurer et al. ................ | 192/45.1 |
| 3,443,672 | 5/1969 | Giese............................. | 192/45.1 |

*Primary Examiner*—Allan D. Herrmann
*Attorney*—Jennings Bailey, Jr.

ABSTRACT: A retainer ring for freewheel clutches is assembled from metal ring links which are pivotably connected to one another and support tiltable sprags between them. The links comprise flanges arranged in pairs opposite to one another and connected by bolts. Studs project from the flanges to the inner side of each link, and the sprags are tiltably mounted between the studs. Two different embodiments of such retainer rings are disclosed. In one embodiment first-type links, on which the tiltable sprags are mounted, are arranged in alternating order with second-type links not provided with sprags. In a second embodiment ring links of one type only are used which hold the sprags between studs on one side of the bolt while they are hinged with the other side on the studs of the adjacent link.

INVENTORS
EMIL GIESE
RUPRECHT MAURER
ALBRECHT MAURER

METAL RETAINER RING FOR FREEWHEEL CLUTCH

BACKGROUND OF THE INVENTION

1. Field of the Invention

The present invention relates to freewheel clutches, more particularly to retainer rings for the tiltable sprags in such clutches.

2. The Prior Art

In the U.S. Pat. 3,443,672, issued May 13, 1969 to Emil Giese, Germany, coinventor of the present invention and assigned to the same assignee, a particular type of freewheel clutches is disclosed which comprises tiltable sprags disposed in a cage ring consisting of a closed ring having perpendicularly extending guide members and a cover ring which is secured to the guide members after the sprags have been inserted. The guide members have partially cylindrical bearing surfaces which are in close contact with the cylindrical outer surfaces of the sprags, as a consequence whereof the sprags are safely retained within the ring, both in axial and radial direction. In mounted state the cage ring and the sprags thus form an assembly which cannot fall apart. This eliminates the danger of component parts of the cage ring getting lost, for example, during shipment and further greatly facilitates the mounting of the sprags between the clamping surfaces of the driving and the driven clutch members.

It is, however, a disadvantage of this type of cage rings or retainer rings that they must be especially designed for each particular clutch so as to correspond with the average diameter of this clutch. Different average clutch diameters require different retainer rings, so that a large number of rings must constantly be kept in stock. Further, every clutch size requires special tools and appliances which reflects unfavorably on the production price, especially of those clutch sizes having a less common diameter. Moreover, for odd clutch sizes the appliances must, as a rule, first be procured in order to be able to start manufacture, which results in untolerably long delivery times.

These disadvantages have been overcome by a retainer ring as disclosed in the Pat. application Ser. No. 815,802, filed Apr. 14, 1969 in the United States Patent Office. A retainer ring described in this application comprises separate links which are pivotably connected to one another in the radial plane of the clutch so as to form a chain. The links have the form of two oval flanges arranged opposite to one another and connected by bridge portion. The oval flanges of one link are hinged on the flanges of the adjacent links, and between the bridge portions of two neighboring links a tiltable sprag is supported.

From such links retainer rings may be assembled in almost any sizes. It is a particular advantage of this type of retainer rings that the average ring diameter must not necessarily be selected in accordance with the number of links employed. There is always the possibility of leaving the ring open and mounting the open ring between the clutch members. After mounting, peripheral forces which occur during rotation of the clutch cannot pull the links apart since the ring rotates between the concave and the convex cylindrical surfaces of the driving and the driven clutch members.

Unfortunately the links of this type of retainer rings can practically only be manufactured from plastic material. Manufacture from metal cannot be accomplished economically. This results in a rather limited range of application of such plastic material links. They can only be used if the maximal heat developed in dependence on the clutch load and other operation conditions remains below the softening temperature of the plastic material.

It is therefore an object of the present invention to provide a retainer ring for tiltable sprags which is assembled from links manufactured from metal. It is another object to provide a metal retainer ring which is resistant to high thermal and mechanical load. It is a further object to provide a metal retainer ring which gives exact guidance to the sprags both in radial and circumferential direction. It is still another object to provide a metal retainer ring which can be readily adjusted to all occuring average clutch diameters simply by adding or taking away one or more ring links. It is still another object to provide a metal retainer ring which allows for differences in the burnishing path due to production tolerances, thereby avoiding fractures of the retainer ring. And it is another object to provide a retainer ring of which the component parts, including the tiltable sprags, are safely interconnected to one another.

SUMMARY OF THE INVENTION

The above stated objects are attained by retainer rings which, according to the invention, are put together from metal ring links. Each individual ring link is assembled from simple metal plates and bolts which are easy to manufacture and easy to mount.

In a first embodiment of the invention the retainer ring comprises first-type ring links and second-type ring links. The first-type ring links comprise two oblong metal plates which are connected to one another by a bolt and which are provided with two holes each, at equal distances from the bolt. Studs are inserted in the holes so as to face one another in two pairs. The sprags are provided with grooves in their faces, which grooves extend in circumferential direction of the clutch through the central face portions. By means of the grooves the sprags are hinged on two opposite studs and a helical spring is supported at least on one of the studs for urging the clamping surfaces of the sprags into contact with the bearing surfaces of the inner and the outer clutch member.

The second-type ring links comprise two Z-shaped metal plates also connected to one another by a bolt. The Z-branches of the plates are at their ends provided with a catch. The catches are open holes defined between the branch ends and the central portion of the Z-configuration. The branches are resilient in radial clutch direction, so that the Z-shaped plates can easily be snapped over the studs of adjacent first-type links. The first-type links and the second-type links are thus arranged in the retainer ring in alternating order with the first-type links supporting the sprags between their flanges and the second-type links pivotably interconnecting the first-type links and providing a guide for the sprags in circumferential direction of the clutch.

Within the retainer ring according to the invention the sprags are safely guided both in axial and in circumferential direction of the clutch. In axial direction guidance is provided by the flanges of the links and the studs, respectively, while in circumferential direction the bolts of the first-type and second-type links prevent the sprags from dropping out. The latter can only pivot in the radial plane of the clutch as is desired, and the helical springs ensure proper contact between the sprags and the clutch members.

Mounting the Z-shaped branches on the adjacent studs in pivotable manner by bending the branches within the range of their elasticity produces a retainer ring which can be adjusted to almost any torque and clutch size.

The flexibility inherent in at least the second-type ring links imparts an elasticity to the whole retainer ring in circumferential direction of the clutch. As a consequence tolerances in the production of the inner and outer clutch members and differences of the burnishing path resulting therefrom cannot cause fractures of the retainer rings mounted in a clutch.

Further, in mounted state the sprags are undetachably supported by the studs and thus cannot be lost and, moreover, assembling the links to form quite different ring sizes can be accomplished without additional operation just by hinging an appropriate number of ring links.

The retainer ring according to the invention thus meets all requirements with regard to resistance against thermal and mechanical load. The link plates and bolts and studs can be manufactured from annealed steel and the bolts and plates can be riveted together.

In a second embodiment of the invention, the retainer ring is assembled from one type of ring links only. Each link comprises two substantially Z-shaped metal plates having holes in the central portion and at the ends of both Z-branches. The holes are arranged along a straight line. Two plates are positioned opposite to one another and are interconnected by a bolt riveted into the central holes. Studs are inserted in the two holes on one side of the bolt so as to face one another and clamping sprags of the type described in the first embodiment are mounted between the studs by means of their grooves. A helical spring is again mounted on at least one of the studs for urging the sprags into contact with the clutch members.

The ring is then assembled by hinging each individual link with the two holes on the other side of the bolt on the studs of the adjacent link. In this manner a closed ring or at least an open chain is formed which may be disposed between the two clutch members of the freewheel clutch.

The measure of the Z-shaped plates in the radial direction of the clutch is only slightly smaller than the distance between the outer and inner cylindrical bearing surfaces of the two clutch members. This provides for a good support of the ring between the clutch members even when the sprags are not in their clamping position.

Further, in order to minimize friction between the bolts and the sprags' sleeves may be disposed on all bolts in both embodiments of the invention. It is thereby ensured that only rolling friction occurs between the sprags and the bolts 1.

DESCRIPTION OF THE DRAWINGS

Further features of the invention will be readily recognized from the following description when taken in conjunction with the appending drawings, wherein.

DESCRIPTION OF THE PREFERRED EMBODIMENTS

Figure 1:
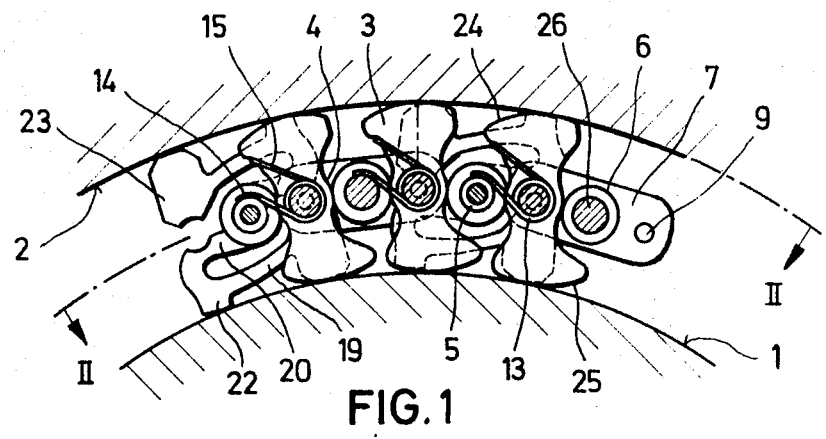
FIG. 1 shows a section of a first embodiment of a retainer ring according to the invention, mounted between the driving and the driven clutch member and cut along line I–I in FIG. 2.
Figure 2:
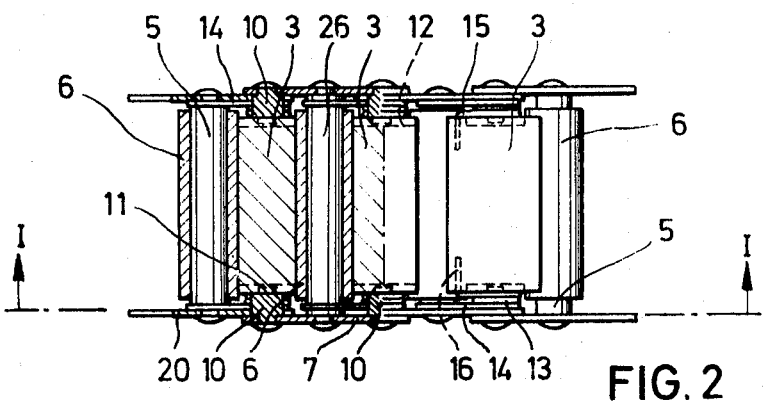
FIG. 2 is a top view of the retainer ring section of FIG. 1.
Figure 4:
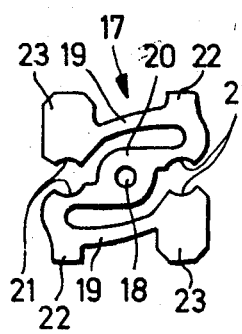
FIG. 4 shows a plate of the first-type ring links of the first embodiment of the invention.
Figure 3:
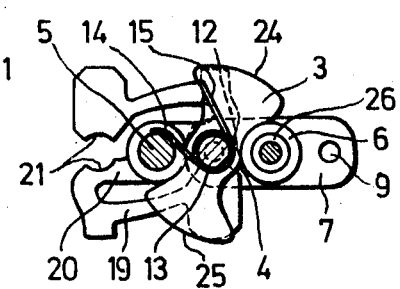
FIG. 3 shows two adjacent ring links of the retainer ring of FIG. 1.
Figure 5:
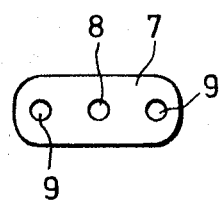
FIG. 5 shows a Z-shaped plate of the second-type ring links of the first embodiment of the invention.
Figure 6:
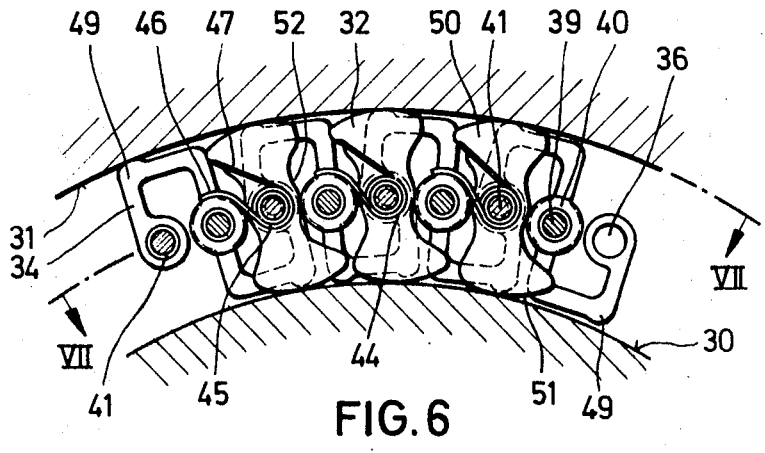
FIG. 6 shows a section of a second embodiment of a retainer ring according to the invention, mounted between the driving and the driven clutch members and cut along line VI–VI of FIG. 7.
Figure 7:
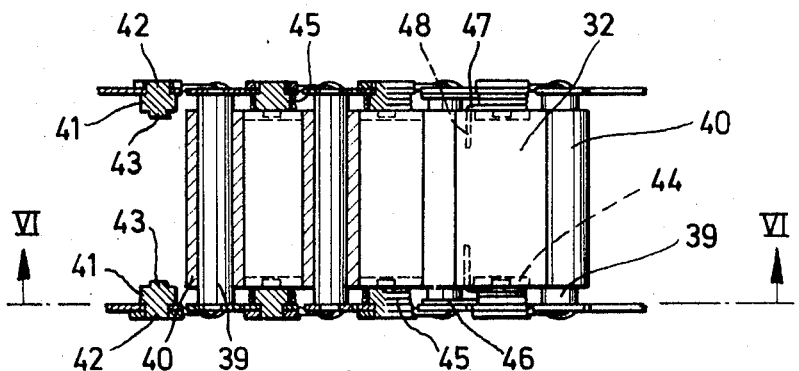
FIG. 7 is a top view of the retainer ring section of FIG. 6.
Figures 8, 9, 10:
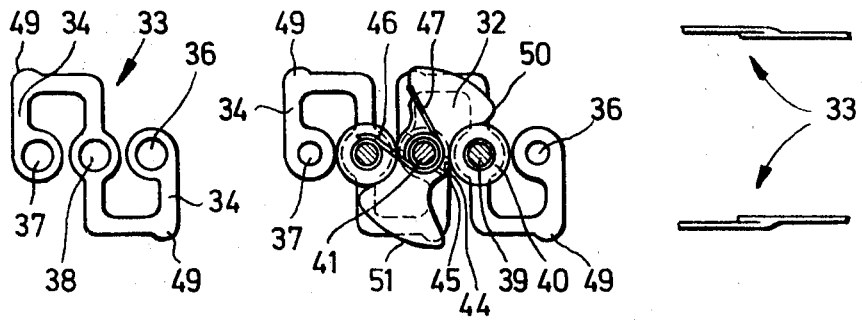
FIG. 8 shows two adjacent ring links of the retainer ring of FIG. 6.
FIG. 9 shows a Z-shaped plate of the ring links employed in the second embodiment of the invention.
FIG. 10 is a top view of the two Z-shaped plates in the second embodiment, without showing the bolt.

FIG. 1 shows tiltable sprags 3 mounted between an outer cylindrical bearing surface 1 of an inner clutch member and an inner cylindrical bearing surface 2 of an outer clutch member. The side surfaces 4 of the clamping sprags 3 are partially cylindrical. The sprags 3 are retained in their position between bolts 5,26 of a retainer ring assembled from pivotably interconnected ring links, the bolts being provided with rotatable sleeves 6.

An example of a retainer ring including two types of different ring links is shown in detail in FIGS. 1–5, wherein is illustrated that the two types of ring links are arranged in alternate order and are pivotably hinged on one another.

The first-type ring links comprise two oblong metal plates 7 (FIG. 5) which in mounted state in the retainer ring extend the circumferential direction of the clutch. The plates 7 are arranged opposite to one another and a bolt 26 is riveted with its ends in the two central holes 8. Studs 10 are riveted into the holes 9 so as to project to the inside of the link and are aligned in pairs. At their free ends each of the studs is provided with a shoulder, the projecting cylindrical portion forming a pin 11. The cylindrical projections extend into grooves 12 provided in the center of the faces of the sprags 3. The sprags are thus pivotably supported by the studs 10, but safely retained in axial direction of the clutch.

Further, each bolt 10 carries a helical spring 13 having long ends. One end 14 rests against the bolt 5 of the adjacent ring link. The other end 15 is provided with a bent over portion 16 which rests against the sprag 3, urging the latter to pivot into the clamping position.

The second-type ring links are assembled from substantially Z-shaped metal plates 17 (FIG. 4) of which the Z-branches 19 extend in the circumferential direction of the clutch when mounted between the clutch members. The central portions 20 of the plates 17 are provided with a hole 18. Two plates 17 are arranged opposite to one another and are interconnected by a bolt 5 which is riveted with its ends into the holes 18.

The central portions 20 and the branches 19 of each plate define between them an open hole 21 which functions as a catch and serves for hinging the plates 17 on the studs 10 of adjacent first-type links. The branches 19 are resilient in radial direction of the clutch.

In order to guide the retainer ring concentrically between the cylindrical bearing surfaces 1 and 2 and also in order to prevent opening of the holes 21 when the ring is mounted in the clutch——which would mean a separation of the ring——the plates 17 are provided with ears 22,23 on opposite sides, between which the distance is only slightly smaller than the distance between the bearing surfaces 1,2 in radial direction.

Assembling the retainer ring from the riveted ring links of both types and including the sprags 3 and the helical springs 13 is accomplished in the following manner: First two helical springs 13 are placed on the two studs 10 which are, as can be seen from the figures, located on the left-hand side of bolt 26. Then a sprag 3 is hinged on the studs 10 by means of its grooves 12. To this end the ends 15 of the springs 13 must be bent aside in order to permit the sprag 3 to pass between the bent over portions 16 of the springs. Finally the ends 14 of the springs are lifted to an extent permitting a second-type ring link to be moved close to the first-type link so that the catches 21 will snap over the studs 10 of the first-type link which studs carry between them the previously mounted tiltable sprag. Thereafter the spring ends 14 are released to abut against the stud 5 of the second-type ring link. Then another sprag 3 is mounted between the two studs 10 on the right-hand side of bolt 26 in the aforedescribed manner after two springs 13 have been placed on the studs. This time the spring ends 14 abut against the bolt 26, so that the sprag must be kept pressed down until the catches 21 of another second-type ring link have been pushed over the studs 10. From hereon the assembling operation is repeated as aforedescribed, always beginning with the left-hand side of a first-type link.

As can be seen from FIGS. 1 to 5 the plates 17 are always hinged on the studs 10 inside of the plates 7 in order to achieve maximum stability of the retainer ring in the direction parallel to the clutch axis of rotation.

FIGS. 6—10 illustrate a second embodiment of the invention. This retainer ring between the clutch surfaces 30,31 comprises one type of ring links only which hold the sprags 32. The links are assembled from Z-shaped metal plates 33 (FIG. 9), the Z-branches of which extend in the circumferential direction of the clutch, when the ring is mounted in the clutch. The central portion 35 of the Z-shaped plates 33 and also the free ends of the Z-branches 34 are provided with holes 36, 37, 38 of which the centers are arranged along a straight line. A cylindrical bolt 39 is riveted with its free ends into the holes 38 of two plates 33 positioned opposite to one another. A sleeve 40 is journaled on bolt 39 against which the sprag 32 abuts in the circumferential direction of the clutch after the ring has been assembled.

Studs 41 are inserted in the holes 36 of the plates 33 so that the studs project with pieces 42 from the link to the outside, at least by an amount equal to the thickness of the metal plates. On the inside of the link the studs 41 are provided with pins 43, each pin being in alignment with one pin on the opposite plate 33. The pins which are thus arranged in pairs support between them two sprags, one between each pair of studs. The pins 43 extend in grooves 44 provided in both faces of each sprag and extending substantially through the face centers in the circumferential direction of the clutch. In this manner the sprags are pivotably supported but at the same time they are safely protected from displacement in axial and radial direction of the clutch.

Helical spring 45 are also carried by the studs on the inside of the links. One spring end 46 rests against the adjacent bolt 39 while the other end 47, provided with a bent over end portion 48, bears against the sprag 32, which it urges to pivot in the clamping direction.

The studs 41 can be pressed into the holes 36 with their projections 42 which will greatly facilitate assembling of the ring because the studs then cannot drop out again. However, pressing the studs into the holes is not really necessary since from assembled rings the studs cannot fall out.

From a plurality of ring links, sprags 32, and helical springs 45 a retainer ring is assembled in the following manner: First a helical spring 45 is put on each stud 41 and the spring ends 46 are placed against bolt 39 of the link. Then a sprag 32 is pushed on the pins 43 until it is in contact with the sleeve 40 on bolt 39. During this operation sprag 32 engages the spring ends 47, thereby tensioning spring 45. Finally the plates 33 of another link are hinged with their holes 37 on the pins 42 of the studs 41. To this end the branches 34 must be bent slightly. As can best be seen from FIG. 10 the branches 34 between the holes 38 and 37 are bent to the outside in parallel to the remaining branches so that those branches hinged on the pins 42 will not stand off obliquely. After hinging the branches 34 with the holes 37 on the pins 42, the sprag 32 is safely retained between the two sleeves 40 carried by the bolts 39.

Again, the plates 33 may be provided with ears 49 between which the distance in radial clutch direction is only slightly smaller than the radial distance between clutch members 30 and 31.

The embodiments illustrated in FIGS. 1—10 are susceptible to various modifications as may be required by particular operating conditions. For example, bolts having partially cylindrical surfaces as disclosed in U.S. Pat. 3,443,672 may be riveted together with the plates 7, 17, 33, which bolts will then hold the cylindrical surfaces 4,52 of the sprags 3,32 in such a manner that the sprags are undetachably retained in the ring. The pins 11,43 of the studs 10,41 and the grooves 12,44 in the sprags 3,32 can then be dispensed with.

Further, the links illustrated in FIGS. 6—10 may be assembled in such a way that the bolt 39 is riveted into the holes 36 or 37 of the plates 33, thus leaving hole 38 free for the studs 41 to be inserted into.

Normally the sprags 3,32 are shaped so that they are neither pressed against the inner clutch member nor lifted therefrom by the centrifugal force resulting from their rotation about the clutch axis, independently of their tilting position. If, however, the outer clutch member 2,31 during free wheeling rotates at a considerably higher velocity relative to the inner clutch member 1,30 it may be advantageous to avoid friction between the sprags 3,32 and the clamping surfaces of the clutch members altogether, in order to avoid excessive wear. This may be achieved simply by opening the retainer ring and reconnecting it in opposite direction, i.e. with opposite curvature and remounting it in this state between the clutch members. Under the effect of the centrifugal force the sprags will then abut with their outer surfaces 24,50 against the bearing surface 2,31 of the outer clutch member and will be tilted by the centrifugal force in the sense of lifting their inner surfaces 25,51 from the clamping surface 1,30 of the inner clutch member. This will result in a free wheeling without the sprags being in touch with either one of the clamping surfaces.

What we claim is:

1. A metal retainer ring for a freewheel clutch which drivingly connects a first rotatable clutch member having a convex-cylindrical bearing surface and a second rotatable clutch member having a concave-cylindrical bearing surface in coaxial alignment with the first bearing surface, the retainer ring comprising (a) first-type ring links comprising two oblong metal plates (7) arranged opposite to one another and being provided with three equidistant holes, a bolt (26) riveted with its free ends in the central hole of each plate connecting the plates, and four studs (10) in the outer holes of each plate aligned in pairs and facing one another; (b) second-type ring links comprising two substantially Z-shaped metal plates (17) each having a central portion and free branches arranged opposite to one another and having a hole each in their central portion, the free branches of the Z-configuration each defining with the central portion a catch on either side of the hole between them and the central portion, the catches being equidistantly spaced from the hole, a bolt (5) riveted with its ends in the holes; connecting the plates (c) tiltable sprags (3) for drivingly connecting the first and second clutch members, the sprags being provided with grooves in their faces extending through the centers of the faces, the studs engaging in the grooves whereby the sprags are tiltably mounted between opposite studs of the first-type of ring links; the second-type ring links being arranged between the first-type ring links in alternating order with the catches on one side of the second-type ring links embracing the studs of one first-type ring link and the catches on the other side embracing the studs of another first-type ring link, and (d) spring means operatively engaging the studs for urging the tiltable sprags with their clamping surfaces into contact with the bearing surfaces of the clutch members.

2. A metal retainer ring as claimed in claim 1, and further comprising cylindrical sleeves rotatably mounted on the bolts of the first and second ring link types.

3. A metal retainer ring as claimed in claim 1, wherein the spring means are helical springs mounted adjacent one face of each sprag on the stud, the springs being provided with long ends, one of which bears against the sprag while the other end rests against the bolt of the adjacent second-type ring link.

4. A metal retainer ring as claimed in claim 1, wherein the studs are loosely inserted in the holes of the metal plates.

5. A metal retainer ring as claimed in claim 1, wherein the studs are riveted into the holes of the metal plates.

6. A metal retainer ring as claimed in claim 1, wherein the studs of the first-type ring links are provided with shoulders against which the sprags rest.

7. A metal retainer ring as claimed in claim 1, wherein the Z-shaped metal plates of the second-type ring links are provided with projecting portions, the distance between these portions in radial direction of the clutch being only slightly smaller than the distance between the outer and inner cylindrical bearing surfaces.

8. A metal retainer ring for a freewheel clutch which drivingly connects a first rotatable clutch member having a convex-cylindrical bearing surface and a second rotatable clutch member having a concave-cylindrical bearing surface in coaxial alignment with the first bearing surface, the retainer ring comprising (a) substantially Z-shaped metal plates (33) arranged in pairs opposite to one another having central portions and branches and having holes in their central portions and in the free ends of their branches, the three holes of each plate being in line with one another, (b) bolts (39) riveted into the central holes of two opposite plates, thereby connecting the plates to form a ring link; (c) studs (41) in the holes on one side of the bolt and facing one another; (d) tiltable sprags (32) for drivingly connecting the first and second clutch member, the sprags being provided with grooves in their faces extending through the centers of their faces, the studs engaging in the grooves whereby the sprags are mounted between the opposite studs on one side of the bolt; (e) spring means mounted on one of the studs supporting each sprag operatively engaging the sprag for urging the sprags with their clamping surfaces into contact with the bearing surfaces of the clutch members, each ring link being hinged with the holes on the other side of the bolt on the studs of the adjacent ring link, thereby forming a retainer ring and securing the sprag in the adjacent link against displacement in the circumferential direction of the clutch.

9. A metal retainer ring as claimed in claim 8, wherein the branches of the Z-shaped metal plates which are hinged on the studs of the adjacent link are bent to the outside in parallel direction to the remaining portions of the plates.

10. A metal retainer ring as claimed in claim 8, and further comprising cylindrical sleeves (40) rotatably mounted on the bolts.

11. A metal retainer ring as claimed in claim 8, wherein the spring means are helical springs mounted adjacent one face of each sprag on the stud, the springs being provided with long ends one of which bears against the sprag and the other one resting against the bolt of the adjacent ring link.

12. A metal retainer ring as claimed in claim 8, wherein the Z-shaped metal plates are provided with projecting portions, the distance between these portions in radial direction of the clutch being only slightly smaller than the distance between the outer and inner cylindrical bearing surfaces.